United States Patent
Evans et al.

(10) Patent No.: US 6,810,173 B2
(45) Date of Patent: Oct. 26, 2004

(54) PUMP POWER MONITOR SYSTEM AND METHOD FOR GAIN CONTROL OF OPTICAL AMPLIFIER

(75) Inventors: Alan F. Evans, Beaver Dams, NY (US); Paul Gavrilovic, Allen, TX (US); Richard W. Riffel, Horseheads, NY (US)

(73) Assignee: Avanex Corporation, Fremont, CA (US)

( * ) Notice: Subject to any disclaimer, the term of this patent is extended or adjusted under 35 U.S.C. 154(b) by 304 days.

(21) Appl. No.: 09/932,522

(22) Filed: Aug. 17, 2001

(65) Prior Publication Data

US 2002/0094158 A1 Jul. 18, 2002

Related U.S. Application Data

(60) Provisional application No. 60/230,019, filed on Sep. 5, 2000.

(51) Int. Cl.[7] .................................................. G02B 6/26
(52) U.S. Cl. .......................................................... 385/27
(58) Field of Search ............................ 385/27; 359/142, 359/334, 344, 341, 177

(56) References Cited

U.S. PATENT DOCUMENTS

| | | | |
|---|---|---|---|
| 5,374,973 A | * | 12/1994 | Maxham et al. .......... 359/341.4 |
| 5,499,135 A | | 3/1996 | Heidemann et al. ........ 359/341 |
| 6,490,077 B1 | * | 12/2002 | Conradi ...................... 359/334 |

FOREIGN PATENT DOCUMENTS

| | | | |
|---|---|---|---|
| EP | 0 552 937 | 7/1993 | ........... H04B/10/16 |
| EP | 0 630 083 | 12/1994 | ............. H01S/3/06 |

OTHER PUBLICATIONS

Emroi, Y.; Namiki, S,; "100nn Banwidth flat gain Raman amplifiers pumped and gained–equallized by 12–wavelength–channel WDM high power laser diodes "Feb. 21–26, 1999, Optical Fiber Communication Conference, 1999, pp. PD 19/1–PD 19/3.*

* cited by examiner

Primary Examiner—J. F. Duverne
(74) Attorney, Agent, or Firm—Moser, Patterson & Sheridan, L.L.P.

(57) ABSTRACT

An optical fiber amplifier system includes an optical fiber adapted for use as an optical wave guide amplifier, and at least one optical pump optically coupled into the optical amplifier, wherein the pump receives both a DC electrical input and an AC electrical input, and wherein the pump provides an optical pump power to the optical fiber having both a DC optical power component and an AC optical power component. The optical fiber amplifier system also includes an optical pump power detector optically coupled to the pump, and at least one controller operatively connected to the pump power detector to determine the DC optical power component of the optical pump power, and wherein the controller adjusts the DC electrical input to the pump based on the DC optical power component.

56 Claims, 5 Drawing Sheets

PUMP POWER MONITOR SYSTEM AND METHOD FOR GAIN CONTROL OF OPTICAL AMPLIFIER

CROSS REFERENCE TO RELATED APPLICATIONS

The present application claims priority to U.S. Provisional Pat. App. No. 60/230,019, entitled Pump Power Control of Raman Gain, filed Sep. 5, 2000, which is hereby incorporated herein by reference in its entirety, which claims priority to U.S. patent application Ser. No. 09/641,579, entitled Gain Control in Raman Amplifier, filed Aug. 18, 2000, and which is also hereby incorporated herein by reference in its entirety.

BACKGROUND OF THE INVENTION

1. Field of the Invention

The invention is directed to a pump power monitor method for gain control of an optical amplifier, and in particular, to a pump power monitor method for controlling the gain of an optical amplifier pumping at multiple, distinct wavelengths.

2. Technical Background

Raman amplification occurs when higher-energy or shorter wavelength, pump photons scatter off the vibrational modes of a materials lattice matrix, i.e. optical phonons, and coherently add to lower-energy or longer wavelengths, signal photons. Typically, a pump laser is used to provide pump radiation through a Raman medium to generate stokes radiation in another wavelength range by Raman scattering. The stokes radiation is then used to amplify a source signal conducted through the Raman medium. A direct consequence of this is that Raman amplification can be realized at any wavelength in any optical fiber by correct choice of the wavelength of the optical pump.

Interest in developing applications for Raman amplification subsided when erbium-doped fiber amplifiers and other rare earth-doped amplifiers became known. Erbium-doped fiber amplifiers typically require less power to generate a given amount of gain when compared to Raman amplifiers. However, erbium-doped amplifiers effectively operate over only a limited wavelength band. While an erbium-doped fiber can be used for amplification in a wavelength band extending from 1530 nm to 1610 nm, such an amplifier configuration would require at least three erbium-doped fibers to cover this entire range. In comparison, Raman amplification allows amplification of the entire wavelength range within a single optical medium.

Raman amplification has become a viable commercial technology with demonstrations of wave division multiplexing near the zero-dispersion wavelength of dispersion shifted fibers. In such applications, typically referred to as Raman-assisted transmission, a pump light is launched into an optical fiber at inline amplifier sights in an opposite direction to that of the source signal, or the signal being amplified. The amplification is distributed along the transmission fiber with gain increasing exponentially near the output end near of the transmission fiber.

As distributed Raman-assisted transmission is rapidly becoming a commercial reality, several technical problems must be overcome. In contrast to erbium-doped amplifiers, there is little control or knowledge of the result and gain prior to installation due to several variables including variation in the effective area of a single fiber or multiple fibers combined within a particular span, pump wavelength attenuation, including that of the fiber(s) themselves as well as between the fiber(s) and the amplifier, and Raman gain coefficient of the fibers that are combined to cover the span.

Specifically, due to manufacturing variations in the magnitude of Raman gain coefficient fiber, effective area attenuation at the pump wavelength, power optimization is not only necessary between fiber types but also within a particular fiber type. Another variable making control of gain and gain ripple difficult is the spectral variations within different fibers and particular fiber types. The spectral variations alone can cause gain ripple to be greater than 0.5 dB, and sometimes greater than 1dB. A further drawback is the manufacturing variability in the central pump power wavelength and thermal changes to the periodicity of the stabilizing fiber Bragg grating. Therefore, control of the amplification, including gain and gain ripple, within distributed Raman-assisted transmissions requires significant control, especially for transmission rates of 40 Gb/s for distances greater than 600 km.

SUMMARY OF THE INVENTION

This invention relates to a pump power monitor method for controlling the gain of an optical amplifier. More specifically, the present inventive pump power monitor method provides for gain control of an optical amplifier pumping at multiple wavelengths. Further, while the present inventive pump power monitor method is discussed with respect to Raman amplification, the method that may be implemented in conjunction with other optical amplifiers including, but not limited to, erbium-doped fiber amplifiers operating at multiple wavelengths.

In one embodiment, an optical fiber amplifier system includes an optical fiber adapted for use as an optical wave guide amplifier, and at least one optical pump optically coupled to the optical fiber, wherein the pump receives both a DC electrical input and an AC electrical input, and provides an optical pump power having both a DC optical power component and an AC optical power component to the optical fiber. The optical fiber amplifier system further includes a pump power detector optically coupled to the pump, and at least one controller connected to the pump power detector and adapted to determine the DC optical power component of the optical pump power, wherein the controller is adapted to adjust the DC electrical input to the pump.

In another embodiment, a Raman optical fiber amplifier system includes an optical fiber adapted for use as a Raman optical fiber amplifier, and at least one optical pump optically coupled to the optical fiber, wherein the pump receives both a DC electrical input and an AC electrical input, and provides an optical pump power having both a DC pump power component and an AC pump optical component to the optical fiber. The Raman optical fiber amplifier system further includes a pump power detector optically coupled to the pump, and a controller operatively connected to the pump power detector and adapted to determine the DC optical power component of the optical pump power, and adjust the DC electrical input of the pump.

In addition, embodiments of the optical fiber amplifier system include controlling the gain of a single optical amplifier operating at a given wavelength, controlling the gain of an optical amplifier that includes multiple pumps operating at multiple wavelengths, individual control circuits for controlling the gain of each of the optical pumps associated with the amplifier, and a switching system for controlling multiple optical pumps operating at multiple at multiple wavelengths with a single control circuit.

Other embodiments include an optical communication system that utilizes the pump power monitor scheme, as well as a method for utilization of the pump power monitor scheme.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

Reference will now be made in detail to the present preferred embodiments of the invention, examples of which are illustrated in the accompanying drawings.

DETAILED DESCRIPTION OF THE PREFERRED EMBODIMENTS

Additional features and advantages of the invention will be set forth in the detailed description that follows and will be apparent to those skilled in the art from the description or recognized by practicing the invention as described in the following description together with the claims and appended drawings.

It is to be understood that the forgoing description is exemplary of the invention only and is intended to provide an overview and an understanding of the nature and character of the invention as it is defined in the claims. The accompanying drawings are included to provide a further understanding of the invention and are incorporated and constitute in part of the specification. The drawings illustrate various features and embodiments of the invention, in which, together with their description, serve to explain the principles and operation of the invention.

The pump power monitor system and method of the present invention is adapted to optimize the pump power associated with an optical amplifier to meet required gain and gain ripple specifications. The gain and gain ripple specifications are maintained by monitoring the associated pump powers and error signals as deviated from a particular set point, which are fed back to a pump drive current powering each associated optical pump. It should be noted that while the present invention pump power monitor method is discussed with respect to Raman amplification, it may be implemented in conjunction with other optical amplifiers including, but not limited to, erbium-doped fiber amplifiers operating at multiple wavelengths.

In the illustrated example, an optical fiber amplifier system 10 (FIG. 1) includes an optical pump 12 generating a pump radiation, as indicated by a directional arrow 13, to an optical wave guide amplifier 14 operating as an optical transmission fiber. As described herein, an amplifier system does not include a transmitting and/or receiving station, nor more than 1 km of transmission fiber that is not utilized for Raman amplification. As illustrated, optical pump 12 includes a Raman laser. For example, a semiconductor diode laser, a Raman fiber laser, or other laser emitting device may be substituted. It should be noted, that a plurality of laser emitting devices may be used simultaneously to provide amplification across a wide wavelength range as described below. Further, amplifier fiber 14 may also be utilized as a dispersion compensating fiber. The pump radiation or pump power 13 is transmitted to amplifier fiber 14 through optical tap 18. Optical pump 12 receives an electrical input as represented by a directional arrow 19 having both a DC electrical input component and an AC electrical input component. As a result, optical pump power 13 includes a DC optical pump power component and an AC optical pump power component.

Figure 1:
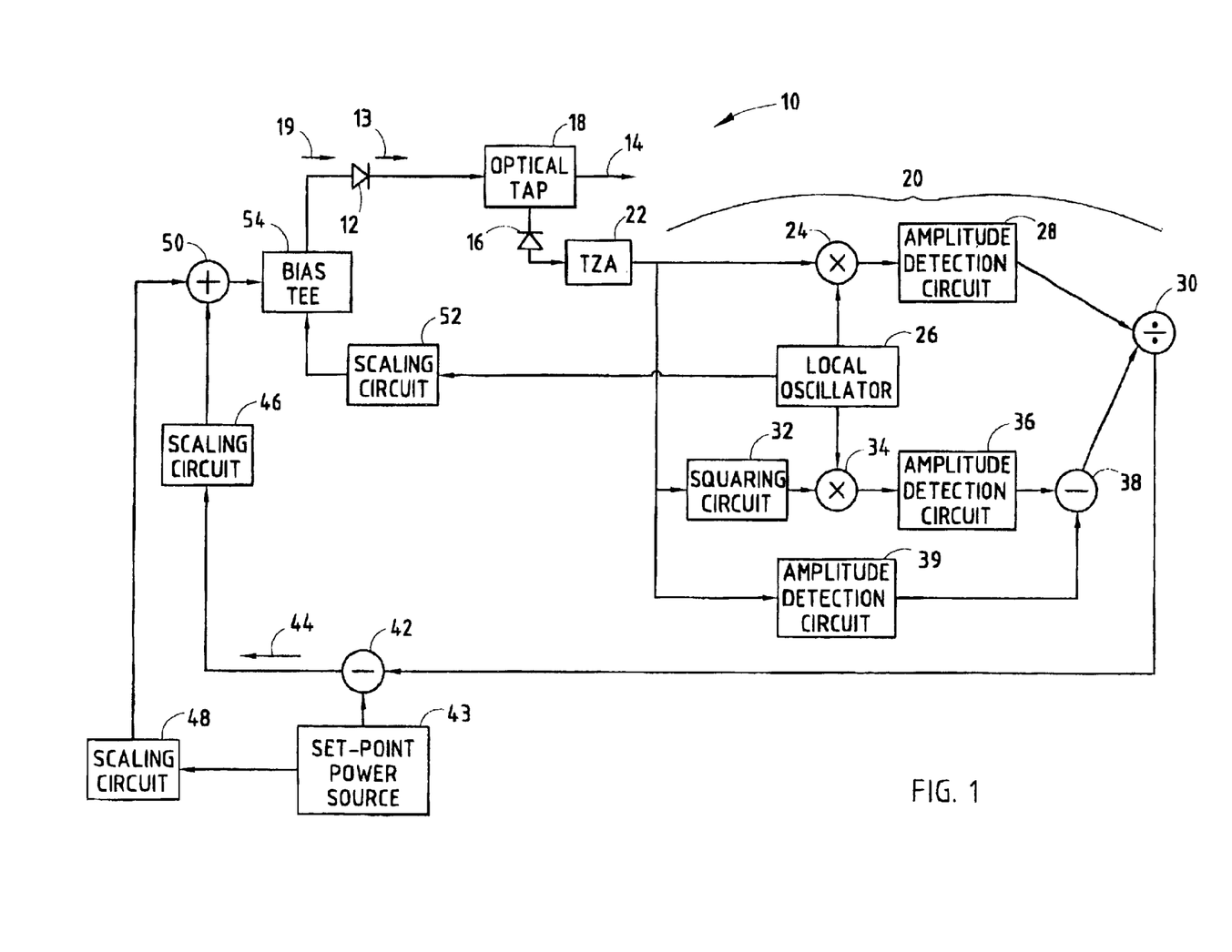
FIG. 1 is a schematic view of a pump power monitor system for controlling the gain of an optical amplifier embodying the present invention, including a single pump and a single control circuit.

An optical tap 18 diverts a portion of pump power 13 to a controller circuit 20 via an optical photodiode 16 and a trans-impedance amplifier 22. In the illustrated example, optical tap 18 includes a single, 1×2, fiber-based, 2% optical tap, however, other optical components capable of tapping a percentage of pump power 13 may be substituted. It should be noted, that digital equivalents to controller circuit 20 may be substituted therefore, as well as other analog circuitry described herein. The optical photodiode 16 operates as a pump power detector, provides a corresponding electrical signal to a trans-impedance amplifier 22, and provides an electrically equivalent signal of pump power 13 to controller circuit 20.

After pump power 13 has been detected and converted by trans-impedance amplifier 22, the electrically signal is proportional to $P_{DC}+m \cos(w_1)t$ where $P_{DC}$ is the DC component of the optical pump power, m is the AC component of the optical pump power and $_i$ is the frequency of modulation of the $i^{th}$ pump laser, the significance which will be described below. The electrically amplified signal is provided to a mixing circuit or mixer 24 where it is coupled with a signal received from a local oscillator 26. Local oscillator 26 provides the modulation of the AC to both mixer 24 as well as to the AC electrical input component of electrical input 19 to optical pump 12 as described below. The mixed signal provided by mixer 24 is then detected by an amplitude detection circuit 28, which is in turn provided to a dividing circuit or divider 30. By frequency mixing the electrical signal provided by the trans-impedance amplifier 22 with local oscillator 26 having the same frequency, $\omega_i$ the signal going to divider 30 is proportional to m. A squaring circuit 32 squares the signal as provided by trans-impedance amplifier 22, thereby resulting in a signal that is proportional to $P_{DC}^2+P_{DC}2m\cos(w_1)t+m^2\cos^2(w_1)t$. The squared signal is then mixed with local oscillator 26 via a mixing circuit or mixer 34 and is then detected by an amplitude detection circuit 36, thereby providing a signal proportional to $2mP_{DC}$ at the output of the amplitude detection circuit 36. When one multiple local oscillator 26 are present, for multiple optical pumps (i.e., one oscillator for each pump), an additional path out of the trans-impedance amplifier is utilized. More specifically, an amplitude detection circuit 39 is used to detect the amplitude of the signal as provided by trans-impedance amplifier 22, which is in turn fed to a subtraction circuit where it is compared with the signal proportional to $2m\ P_{DC}$. The signal as provided by subtraction circuit 38 is then compared with the signal from amplifier protection circuit 28 via divider 30, thereby providing a final output signal that is proportional to $P_{DC}$.

The signal proportional to $P_{DC}$ is then used to calculate the optimum power setting of optical pump 12. Specifically, the $P_{DC}$ signal is fed to a subtraction circuit 42 where it is compared with a signal received from a power source 43 that is sent to optimize laser diode power set points, thereby resulting in a error signal as indicated by a directional arrow 44. The error signal 44 is fed to a scaling circuit 46. The power source 43 providing the laser diode power set points provides an optimized signal to a scaling circuit 48 and then to an adding circuit 50 where it is combined with the signal from scaling circuit 46. The DC output signal from adding circuit 50 is then combined with an AC signal as provided by local oscillator 26. Specifically, the AC signal provided by local oscillator 26 is fed to a scaling circuit 52, and the resulting signal is combined with the DC signal from adding circuit 50 via a bias T circuit 54. This combined AC/DC signal from bias T 54 functions as electrical input signal 19 for optical pump 12, to precisely control pump 12.

Figure 2:
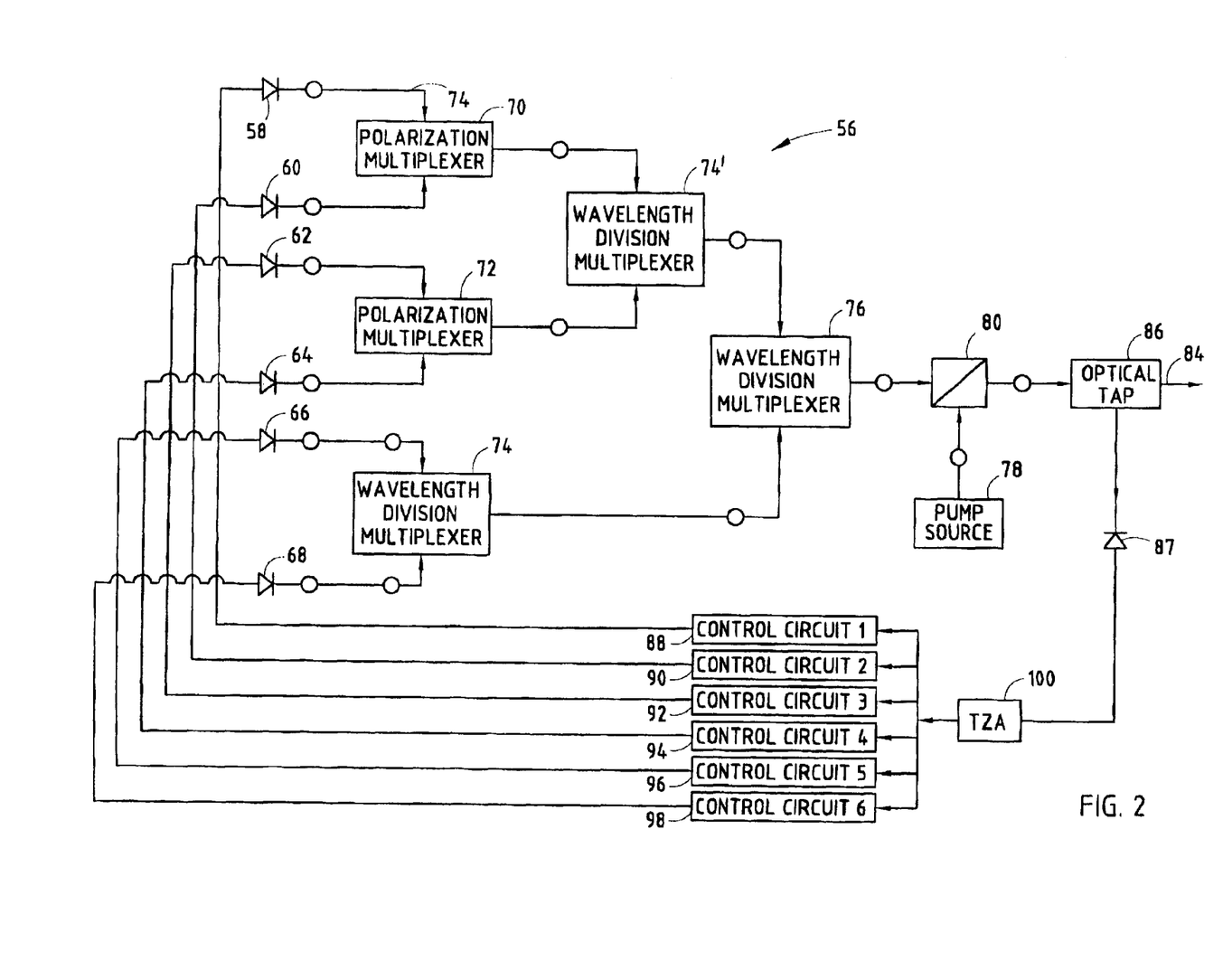
FIG. 2 is a schematic view of a first alternative embodiment of the pump power monitor system for controlling the gain of an optical amplifier, including multiple optical pumps and multiple controlling circuits associated therewith.

In a preferred embodiment, a plurality of optical pumps are utilized to provide gain across a plurality of distinct wavelength ranges. Specifically, an optical fiber amplifier system 56 (FIG. 2) includes a plurality of optical pumps 58, 60, 62, 64, 66, and 68, similar to optical pump 12 described above with respect to amplifier system 10. As illustrated in FIG. 2, the optical outputs of optical pumps 58, 60, 62, 64, 66, and 68 are combined through polarization multiplexers and wavelength division multiplexers (WDMs). These pumps provide pump powers at four pump wavelengths and are preferably high power 14xx fiber Bragg grating stabilized, Fabry Perot semiconductor lasers. The optical pumps preferably have a small AC modulation at a frequency greater than 10 kHz. The electrical frequencies are provided by an oscillator(s) 26 to each of the optical pumps 58, 60, 62, 64, 66, and 68 and are preferably unique with an electrical frequency spacing between each pump that is unequal. These electrical frequencies have an amplitude of modulation preferably within the range of between about 10 mA to about 200 mA, and more preferably within the range of about 100 mA to about 200 mA. In the embodiment of FIG. 2, the oscillators 26 are contained in control circuits 88 through 98. It should be noted that the modulation frequency should be well separated to facilitate individual electrical filtering. In addition, the frequencies should be spaced to keep its filter band of a given amplitude detection circuit, that the frequencies should be greater than 10 kilohertz so as to avoid a transfer of any particular frequency component to the signals traveling in an opposite direction thereto, and that the magnitude of the current modulation should be great enough to facilitate detection thereof.

As illustrated, the pump power as provided by optical pumps 58 and 60 are at the same wavelength and orthogonally polarized, and is combined in a fiber-based polarization multiplexer 70. A similar combination of pump power as provided by optical pumps 62 and 64 is conducted via a fiber-based polarization multiplexer 72. As illustrated, pump powers having wavelengths with only one associated optical pump 66 and 68 are combined with a wavelength division multiplexer 74. The unpolarized light from the polarization multiplexers 70 and 72 are combined with a wave length division multiplexer 74'. In the illustrated example, a fiber-based wavelength division multiplexer 76, or possibly a micro-optic, is used to combine the pump power from optical pumps 58, 60, 62 and 64 with the pump power as provided by pumps 66 and 68. In the present example, optical pumps 58, 60, 62 and 64 provide pump power within the wavelength range of between about 1400 nm to about 1510 nm, while optical pumps 66 and 68 provide pump power within the wavelength range of between about 1470 nm and 1510 nm. It should be noted that the operating wavelength ranges of optical pumps 58 through 68 may also include other wavelength ranges so as to amplify the entire S-band, C-band and L-band. Additional pumping wavelength ranges can be provided via a pump source 78 similar to that described above, and coupled with the output of wavelength division multiplexer 78 via an optical coupler 80.

The pump power as provided by optical pumps 58–68 and any additional pumping sources 78 are transmitted to an optical wavelength fiber 84 similar to amplifying fiber 14 described above. An optical tap coupler 86, similar to optical tap 18 described above, directs a portion of the pump power as provided by optical pumps 58–68 to a plurality of control circuits 88, 90, 92, 94, 96 and 98 via a trans-impedance amplifier 100, similar to transimpedance amplifier 22 as described above. Each control circuit 88–98 operates similarly to control circuit 20 as described above, thereby allowing precise control of the gain and gain ripple as introduced into a source signal traveling along fiber 84 by optical pumps 58–68. Each control circuit 88–98 includes an electrical oscillator with an unique modulation frequency. These oscillators apply different AC electrical input to their respective optical pumps and to their respective mixers.

The reference number 56a (FIG. 3) generally designates a second preferred embodiment of the present invention. Since amplifier system 56a is similar to the previously described amplifier system 56, similar parts appearing in FIG. 2 and FIG. 3 respectively are represented by the same, corresponding reference numeral, except for the suffix "a" in the numerals in the later.

Figure 3:
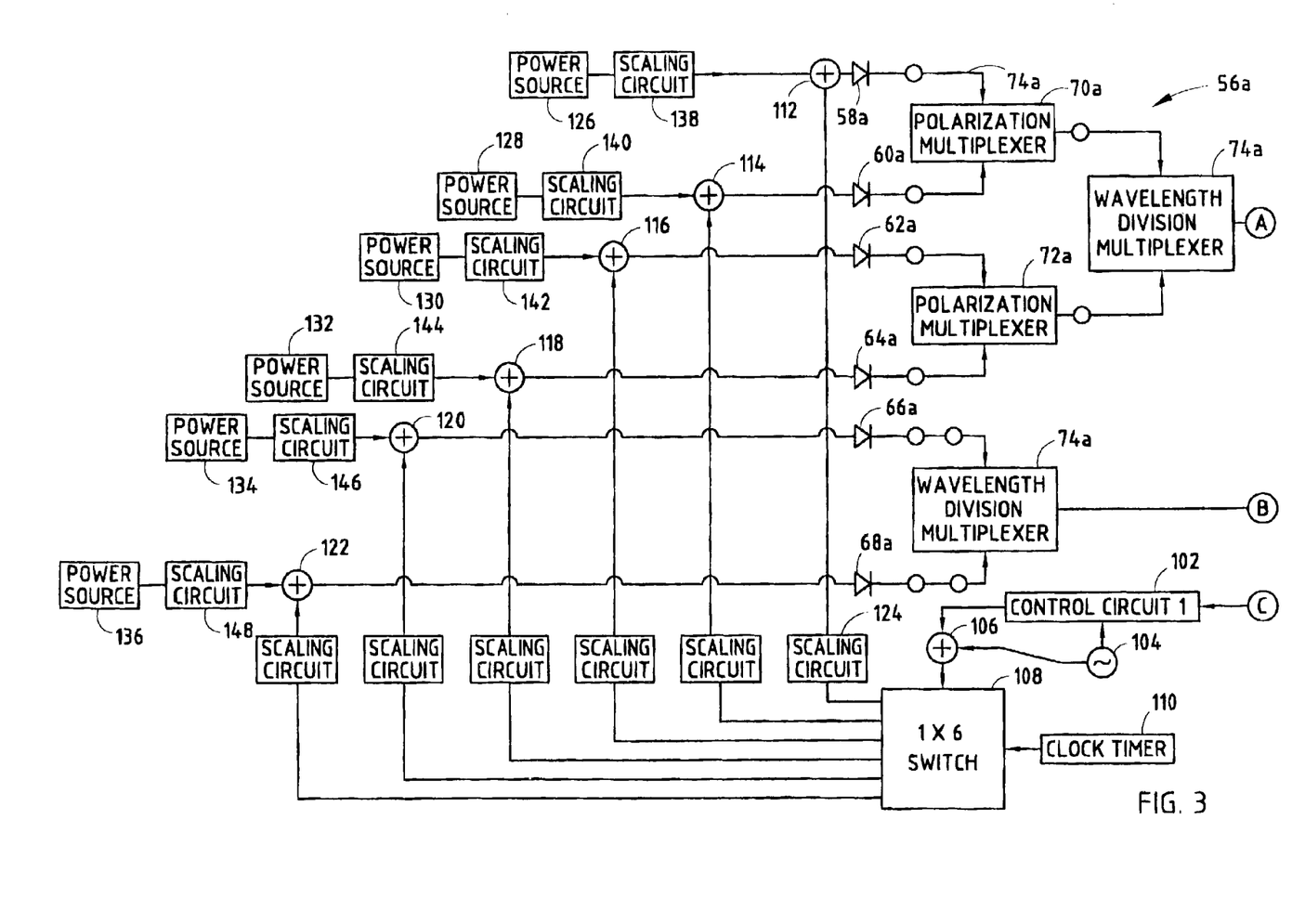
FIG. 3 is a schematic view of the pump power monitor system for controlling the gain of an optical amplifier, including multiple optical pumps, an electrical switch and an associated clock timer.

In amplifier 56a, a control circuit 102, similar to control circuit 20 described above, receives an electrical signal from trans-impedance amplifier 100a and a local oscillator 104 similar to local oscillator 26 as described above. An adding circuit 106 receives the electrical output signal from control circuit 102 as well as an AC electrical input signal from local oscillator 104. The output signal of adding circuit 106 is fed to a 1×6 or six way electrical switch 108 that switches between six output lines associated with the optical pumps 58a–68a and is controlled by a clock timer that sequentially changes the output port of switch 108. The output signal from switch 108 is forwarded to one of a plurality of adding circuits 112, 114, 116, 118, 120 and 122, associated with optical pumps 58a–68a, respectively, via a plurality of scaling circuits 124. The signals as received by adding circuits 112–122 are combined with the laser diode power set points as provided by a plurality of power sources 126, 128, 130, 132, 134 and 136, respectively, via a plurality of a scaling circuit 138.

The optical fiber amplifier systems as disclosed herein provide an optical and electrical configuration to obtain the pump power provided by each optical pump. These optical pump powers can be input into a controlling circuit as described herein, thereby insuring proper optical performance across different fiber types, within the manufacturing distribution of a signal fiber type, and within the manufacturing distribution and thermal range of the optical pumps utilized. It should generally be noted that while analog circuitry is described herein, digital components performing similar functions may be substituted therefore. It will become apparent to those skilled in the art that various modifications to the preferred embodiment of the invention as described herein can be made without departing from the spirit or scope of the invention as defined by the appended claims.

EXAMPLE

In a first example (see FIG. 4), three distinct pump wavelengths were utilized to achieve 12 dB minimum gain and minimum gain ripple below 1 dB with typical LEAF™ fiber which is manufactured and available from Corning Incorporated of Corning, N.Y. Table 1 provides information on wavelengths and pump powers used in this example.

TABLE 1

| Minimum Gain | Gain Ripple | Center Wavelengths | | |
|---|---|---|---|---|
| | | 1461.2 nm | 1477.8 nm | 1511.8 nm |
| 12.1996 | 0.8996 | 1460.7 nm 209 mW | 1477.3 nm 181 mW | 1511.3 nm 210 mW |
| 12.1051 | 0.9694 | 1460.7 nm 209 mW | 1477.3 nm 181 mW | 1511.3 nm 210 mW |
| 12.2623 | 0.9831 | 1460.7 nm 209 mW | 1477.3 nm 181 mW | 1511.3 nm 210 mW |
| 12.1681 | 0.9601 | 1460.7 nm 209 mW | 1477.3 nm 181 mW | 1511.3 nm 210 mW |
| 12.2625 | 0.9732 | 1460.7 nm 209 mW | 1477.3 nm 181 mW | 1511.3 nm 210 mW |
| 12.168 | 0.95850 | 1460.7 nm 209 mW | 1477.3 nm 181 mW | 1511.3 nm 210 mW |
| 12.2833 | 0.9029 | 1460.7 nm 209 mW | 1477.3 nm 181 mW | 1511.3 nm 210 mW |
| 12.2019 | 0.8678 | 1460.7 nm 209 mW | 1477.3 nm 181 mW | 1511.3 nm 210 mW |

Figure 5:
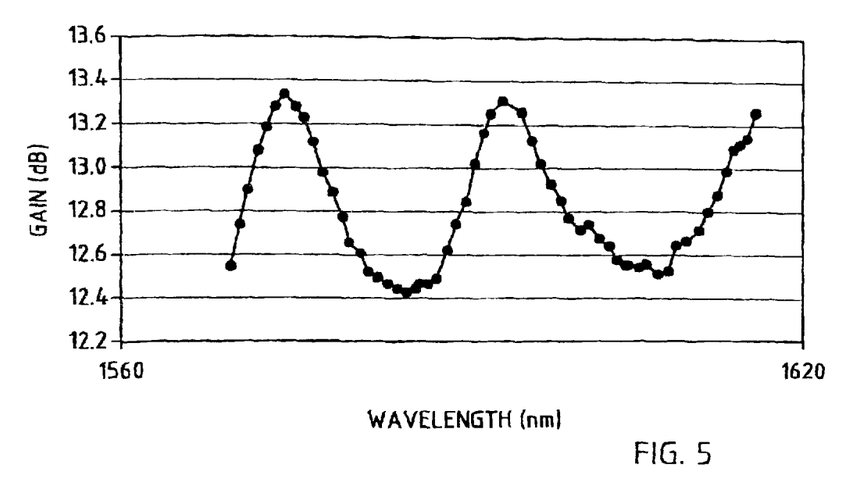
FIG. 5 is a graph of gain vs. wavelength for the system of FIG. 4 adjusted to provide a 12 dB gain and a 0.8 dB gain ripple.

In this example, the maximum pump power requirements are set by 12 dB minimum gain on LEAF™ fiber, if fiber with smaller effective areas are utilized, required pump powers for such fibers will be lower (FIG. 5). These figures illustrate that gain ripple performance can be maintained on such fibers with smaller effective areas by readjusting the pump powers.

Figure 4:
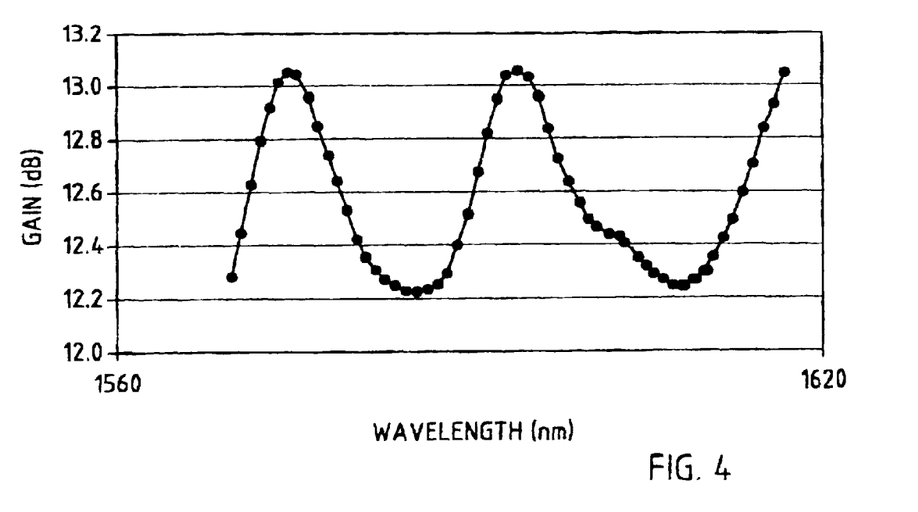
FIG. 4 is a graph of gain vs. wavelength for the pump power monitor system of the present invention utilizing three wavelengths and six optical pumps.

More specifically, the optimum spectral gain dependence for a three wavelength, six pump diode LEAF™ fiber design of an additional example is shown in FIG. 4. In this example, pump powers have been adjusted to give 12 dB minimum gain across the signal spectrum with a gain ripple of 0.80 dB. Lowering and redistributing the pump power gives the gain spectrum for the small effective area fiber as shown on FIG. 5. The corresponding gain ripple at 12 dB minimum gain for this fiber is 0.89 dB. As illustrated, power re-optimization maintains gain ripple performance across different fiber types.

Figure 6:
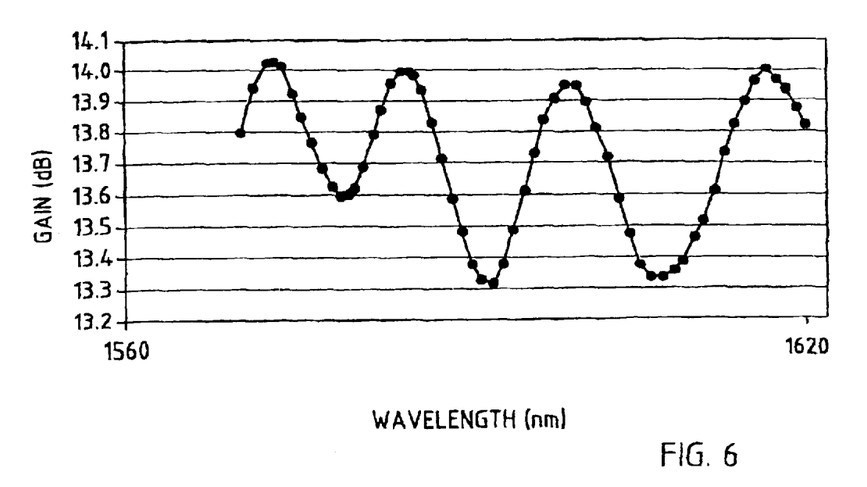
FIG. 6 is a graph of gain vs. wavelength for the pump power monitor system of the present invention utilizing four optical pumps.

Along the same lines, the four (4) pump design of another example utilized a first pump at 1458.6 nm and 165 mW, a second pump at 1469.2 nm and 150 mW, a third pump at 1479.4 nm and 115 mW and a fourth pump at 1507.8 nm and 225 mW. This pumping scheme/system results in a minimum gain to gain ripple ratio of 19.05, a minimum gain of 13.32 dB and minimum to maximum gain ripple difference of 0.699 dB. FIG. 6 illustrates the gain versus wavelength results of the four pump scheme/system.

Amplifier sensitivity to pump center wavelength tolerance was also determined by assuming a +/−0.5 nm center wavelength distribution, and modeling the 16 possible combinations of each pump having either +0.5 nm or −0.5 nm for the pump wavelength design corresponding to FIG. 6.

The worst combination of pump wavelength deviation from center values gives a ripple of 0.8 dB, While maintaining the pump wavelengths and readjusting the pump powers to 145 mW, 130 mW, 145 mW, and 225 mW, for the first, second, third and fourth pumps, respectively, a minimum gain of 13.19 dB and a gain ripple of 0.682 dB were obtained. The results of these examples clearly illustrates that control of pump power assists in maintaining gain ripple in the presence of the variations of pump center wavelength. It should further be noted that the control of pump power also assists in maintaining gain ripple within the manufacturing distribution of a single fiber type.

It will become apparent to those skilled in the art that various modifications to the preferred embodiment of the invention as described herein can be made without departing from the spirit or the scope of the invention as defined by the appended claims.

The invention claimed is:

1. An optical fiber amplifier system, comprising:
   an optical fiber adapted for use as an optical waveguide amplifier;
   at least one optical pump optically coupled to the optical fiber, the pump receiving both a DC electrical input and an AC electrical input, and providing an optical pump power to the optical fiber having both a DC optical power component and an AC optical power component;
   an optical pump power detector optically coupled to the pump; and
   at least one controller coupled to the pump power detector to determine the DC optical power component of the optical pump power, for adjusting the DC electrical input to the pump based on the DC optical power component.

2. The amplifier system of claim 1, wherein the optical fiber is an optical signal transmission fiber.

3. The amplifier system of claim 1, wherein the optical fiber is a dispersion compensating fiber.

4. The amplifier system of claim 1, wherein the optical fiber is a Raman optical waveguide fiber.

5. The amplifier system of claim 1, wherein the controller includes a comparing circuit that determines the DC optical power component of the optical power pump by comparing an electrical pump signal that is proportional to the optical pump power to the square of that electrical pump signal.

6. The amplifier system of claim 5, wherein the comparing circuit includes a first mixer electrically coupled to the pump power detector, a squaring circuit electrically coupled to the pump power detector, a second mixer electrically coupled to the squaring circuit, and a local oscillator electrically coupled to the first mixer and to the second mixer, wherein the oscillator provides input signals to the first and second mixer having the same frequency of modulation as the AC input to the pump.

7. The amplifier system of claim 6, wherein the frequency of modulation of the oscillator is equal to or greater than 10 kHz.

8. The amplifier system of claim 7, wherein the frequency of modulation of the oscillator is within the range of from about 100 kHz to about 200 kHz.

9. The amplifier system of claim 6, wherein the comparing circuit includes a first amplitude detection circuit electrically coupled to the first mixer, and a second amplitude detection circuit electrically coupled to the second mixer.

10. The amplifier system of claim 9, wherein the comparing circuit includes a divider electrically coupled to the first and second amplitude detection circuits, and wherein the divider determines an electrical signal equivalent of the DC component of the optical pump power.

11. The amplifier system of claim 10, wherein the pump power detector includes a photodiode, which converts the optical pump power into the electrical pump signal.

12. The amplifier system of claim 11, wherein the comparing circuit includes a trans-impedance amplifier optically coupled to the first mixer and the squaring circuit, and wherein the trans-impedance amplifier amplifies the electrical pump power.

13. The amplifier system of claim 12, wherein the comparing circuit includes a third amplitude detector circuit electrically coupled to the pump power detector, and a subtractor electrically coupled to the second and third amplitude detection circuit.

14. The amplifier system of claim 1, wherein the at least one pump includes a first pump and a second pump.

15. The amplifier system of claim 14, wherein the optical pump power from the first pump and the optical pump power from the second pump are substantially orthogonal in polarization to one another.

16. The amplifier system of claim 14, further including: a third optical pump and fourth optical pump optically coupled to the transmission fiber and receiving a DC electrical input and an AC electrical input from the controller, for providing an optical pump power having a DC optical power component and an AC optical power component.

17. An amplifier system of claim 16, wherein a single oscillator sequentially controls the first, second, third, and fourth optical pump.

18. The amplifier system of claim 16, wherein the optical pump power provided by the third and fourth pumps are substantially orthogonal in polarization to one another.

19. The amplifier system of claim 16, wherein the optical pump power from the first and second pumps are at a first wavelength, and wherein the optical pump power from the third and fourth pumps are at a second wavelength that is different from the first wavelength.

20. The amplifier system of claim 19, wherein the optical pump powers provided by the first and second pumps are within the wavelength range of about 1400 nm to about 1510 nm.

21. The amplifier system of claim 19, wherein the optical signals amplified by said amplifier are within a wavelength range of about 1520 nm to about 1565 nm.

22. The amplifier system of claim 19, wherein the optical signal amplified by said amplifier system are within a wavelength range of about 1565 nm to about 1620 nm.

23. The amplifier system of claim 19, wherein the optical pump signals provided by the third and fourth pumps are within a wavelength range of about 1470 nm to about 1510 nm.

24. The amplifier system of claim 16, wherein the controller is adapted to determine the DC optical power component of the first, second, third and fourth pumps.

25. An amplifier system of claim 24, wherein each pump is controlled by a separate controller.

26. The amplifier system of claim 24, wherein at least one controller includes a plurality of controllers.

27. The amplifier system according to claim 26, wherein each controller of the plurality of controllers includes an oscillator, and wherein the modulation frequency of each of the oscillators is different from that of the other oscillators.

28. An optical communication system, comprising:
an optical fiber adapted for use as an optical waveguide amplifier;
at least one optical pump optically coupled to the optical fiber, the pump receiving both a DC electrical input and an AC electrical input, and providing an optical pump power to the optical fiber having both a DC optically power component and an AC optical power component;
an optical pump power detector optically coupled to the pump;
at least one controller coupled to the pump power detector to determine the DC optical power component of the optical pump power, for adjusting the DC electrical input to the pump based on the DC optical power component;
an optical transmitter optically coupled with the optical waveguide amplifier, wherein the optical transmitter is adapted to transmit an optical signal; and
an optical receiver optically coupled with the optical waveguide amplifier, wherein the optical receiver is adapted to receive the source signal.

29. A Raman fiber amplifier system, comprising:
an optical fiber adapted for use as a Raman optical waveguide amplifier;
at least one optical pump optically coupled to the optical fiber, the pump receiving both a DC electrical input and an AC electrical input, and providing an optical pump power to the optical fiber, the optical power pump having both a DC optical power component and an AC optical power component;
an optical pump power detector optically coupled to the pump; and
at least one controller operatively coupled to the pump power detector and adapted to determine the DC optical power component of the optical pump power, and wherein the controller adjusts the DC electrical input to the pump.

30. The amplifier system of claim 29, wherein the controller includes a comparing circuit that determines the DC optical power component of the optical pump power by comparing an electrical pump signal that is proportional to the optical pump power to the square of that electrical pump signal.

31. The amplifier system of claim 30, wherein the at least one pump includes a first pump and a second pump.

32. The amplifier system of claim 31, further including:
a third optical pump and fourth optical pump optically coupled to the transmission fiber and receiving a DC electrical input and an AC electrical input, and providing an optical pump signal having a DC optical power component and an AC optical power component.

33. The amplifier system of claim 32, wherein the optical pump power from the first and second pumps are at a first wavelength, and wherein the optical pump power from the third and fourth pumps are at a second wavelength that is different from the first wavelength.

34. The amplifier system of claim 33, wherein the controller is adapted to determine the DC optical power component of the first, second, third and fourth pumps.

35. The amplifier system of claim 29, wherein the optical fiber is an optical signal transmission fiber.

36. The amplifier system of claim 29, wherein the optical fiber is a dispersion compensating optical fiber.

37. An optical communication system, comprising:
an optical fiber adapted for use as a Raman optical waveguide amplifier;
at least one optical pump optically coupled to the optical fiber, the pump receiving both a DC electrical input and an AC electrical input, and providing an optical pump power having both a DC optical power component and an AC optical power component to the optical fiber;
an optical pump power detector optically coupled to the pump;
at least one controller operatively coupled to the pump power detector, and adapted to determine the DC optical power component of the optical pump power, and wherein the controller adjusts the DC electrical input to the pump;
an optical transmitter optically coupled with the optical waveguide amplifier, wherein the optical transmitter is adapted to transmit an optical source signal; and
an optical receiver optically coupled with the optical waveguide amplifier, wherein the optical receiver is adapted to receive the source signal.

38. A method for controlling an optical fiber amplifier system, comprising:
providing an optical fiber adapted for use as an optical waveguide amplifier;
generating an optical pump power with at least one optical pump for transmission along the optical fiber, by providing the optical pump with a DC electrical input and an AC electrical input, the optical pump power having a DC power component and an AC power component;
detecting the optical pump power with an optical pump power detector;
controlling the DC electrical input to the pump by utilizing a controller that is operatively connected to the pump power detector and that determines the DC pump power component of the optical pump power from the pump.

39. The method of claim 38, wherein the step of providing the optical fiber includes providing an optical signal transmission fiber.

40. The method of claim 38, wherein the step of providing the optical fiber includes providing a dispersion compensating fiber.

41. The method of claim 38, wherein the step of providing the optical fiber includes providing a Raman optical waveguide fiber.

42. The method of claim 38, wherein the step of controlling the DC pump power component of the optical pump power includes utilizing a comparing circuit to compare an electrical pump signal that is proportional to the optical pump power to the square of that electrical pump signal.

43. The method of claim 42, wherein the step of controlling the DC pump power component of the optical pump power includes mixing the electrical pump signal and the squared electrical pump signal with a mixing signal having the same frequency of modulation as the AC electrical input to the optical pump, thereby resulting in a mixed electrical signal and a squared, mixed electrical signal.

44. The method of claim 43, wherein the step at controlling the DC pump power component of the optical pump power includes subtracting the electrical pump signal from the squared, mixed electrical signal.

45. The method of claim 44 wherein the subtraction of the electrical pump signal step occurs after the electrical signal amplitude is detected by the amplitude detection circuit.

46. The method of claim 45, wherein the step of controlling the DC pump power component of the optical pump power includes dividing the difference between the electrical pump signal and the squared, mixed electrical signal by the mixed electrical signal.

47. The method of claim 46, wherein the step of controlling the DC pump power component of the optical pump power includes converting the optical pump power to the electrical pump signal via a photodiode.

48. The method of claim 47, wherein the step of controlling the DC pump power component of the optical pump power includes amplifying the electrical pump signal prior to mixing and squaring the electrical pump signal.

49. The method of claim 38, wherein the step of generating the optical pump power includes generating the optical pump power from a first optical pump and a second optical pump.

50. The method of claim 49, wherein the step of generating the optical pump power includes generating the optical pump power from the first and second optical pumps such that the optical pump power from the first and second optical pumps are substantially orthogonal in polarization to one another.

51. The method of claim 50, further including:
generating an optical pump power via a third optical pump and a fourth optical pump for transmission along the optical fiber by providing the third and fourth optical pumps with a DC electrical input component and an AC electrical input component, the optical pump power from the third and fourth optical pumps having a DC pump power component and an AC pump power component.

52. The method of claim 51, wherein the step of generating the optical pump power from the first and second pumps includes providing the optical pump power from the first and second pumps with a first wavelength and wherein the step of generating the optical pump power from the third and fourth pumps includes providing the optical pump power from the third and fourth pumps with a second wavelength that is different from the first wavelength.

53. The method of claim 52, wherein the step of generating the optical pump power from the first and second pumps includes providing the optical pump power from the first and second pumps within the wavelength range of from about 1400 nm to about 1510 nm.

54. The method of claim 53, wherein the step of generating the optical pump power from the third and fourth pumps includes providing the optical pump power from the third and fourth pumps within the wavelength range of from about 1470 nm to about 1510 nm.

55. The method of claim 51, wherein the step of controlling the DC electrical input to the pump includes controlling the DC electrical to the first, second, third and fourth pumps.

56. The method of claim 51, wherein the step of controlling the DC electrical input to the pump includes controlling the DC electrical input to the first, second, third, and fourth pumps with a plurality of controllers.

* * * * *